United States Patent
Nyui et al.

[11] Patent Number: 5,481,106
[45] Date of Patent: Jan. 2, 1996

[54] ENCODER WITH AN OPTICAL SCALE AND INTERFERENCE OF ZERO AND FIRST ORDER DIFFRACTION BEAMS

[75] Inventors: Masaru Nyui; Masahiko Igaki, both of Ohta; Ko Ishizuka, Ohmiya, all of Japan

[73] Assignee: Canon Kabushiki Kaisha, Tokyo, Japan

[21] Appl. No.: 70,996

[22] Filed: Jun. 4, 1993

[30] Foreign Application Priority Data

Jun. 17, 1992 [JP] Japan ................... 4-184506

[51] Int. Cl.$^6$ ................................. H01J 3/14
[52] U.S. Cl. .................... 250/237 G; 250/231.16
[58] Field of Search ............ 250/237 G, 231.14, 250/231.16; 356/374, 375, 356; 33/707

[56] References Cited

U.S. PATENT DOCUMENTS

| | | | |
|---|---|---|---|
| 4,792,678 | 12/1988 | Spies | 250/231 SE |
| 4,820,918 | 4/1989 | Igaki et al. | 250/231 SE |
| 4,988,864 | 1/1991 | Michel et al. | 250/231.16 |
| 5,126,562 | 6/1992 | Ishizuka et al. | 250/231.14 |
| 5,302,821 | 4/1994 | Igaki et al. | 250/237 G |
| 5,323,001 | 6/1994 | Igaki et al. | 250/231.16 |

FOREIGN PATENT DOCUMENTS 1-176914  7/1989  Japan.

*Primary Examiner*—Steven L. Nicols
*Attorney, Agent, or Firm*—Fitzpatrick, Cella, Harper & Scinto

[57] ABSTRACT

An encoder capable of detecting movement information on a moving body with high accuracy without being affected by environmental changes, wherein movement information on a moving body is detected by causing a luminous flux to impinge upon a first scale section of an optical scale which is provided on the moving body and which consists of gratings of a fixed pitch, causing the luminous flux to impinge upon a second scale section of the optical scale, and receiving the luminous flux which has undergone light modulation at the second scale section, and wherein a light adjustment device for intercepting or attenuating a +1st order or −1st order diffracted ray of diffracted rays of light from the first scale section is provided in the optical path extending from the first scale section, an optical image having an intensity distribution of the same grating pitch as the first scale section being formed on the second scale section mainly by the zero order and the −1st order diffracted rays or by the zero order and the +1st order diffracted rays.

6 Claims, 7 Drawing Sheets

FIG. 5
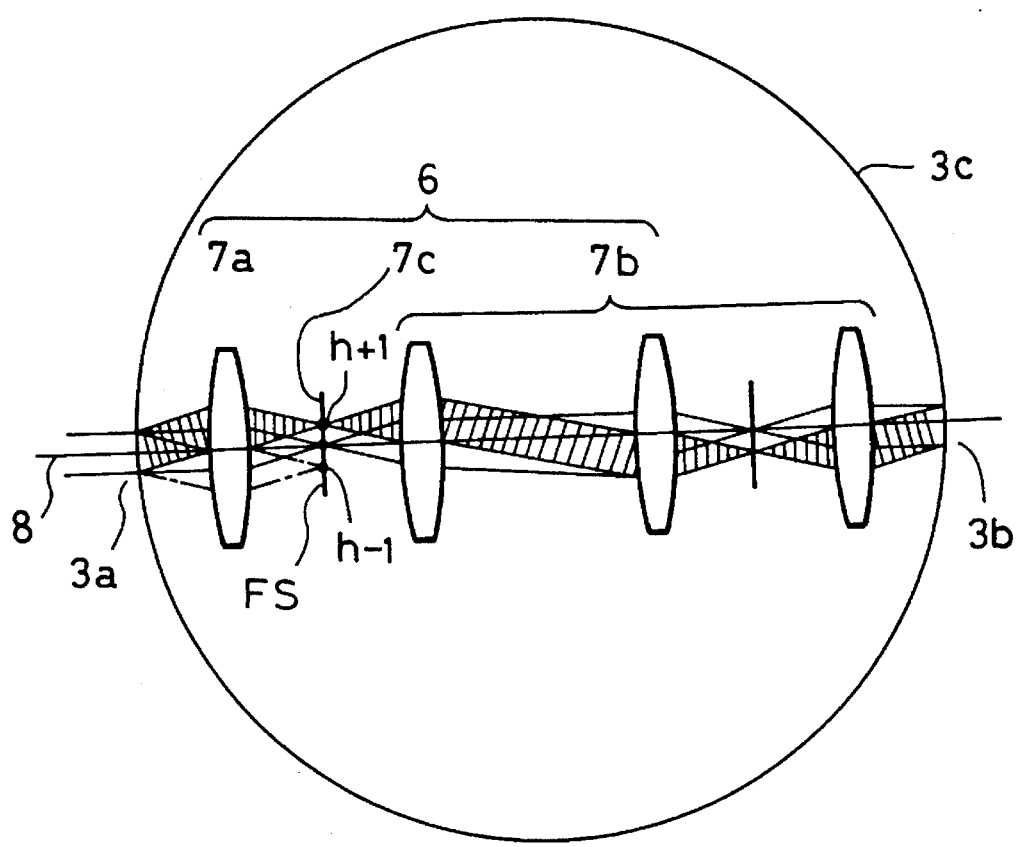
FIG. 6(A)
FIG. 6(B)
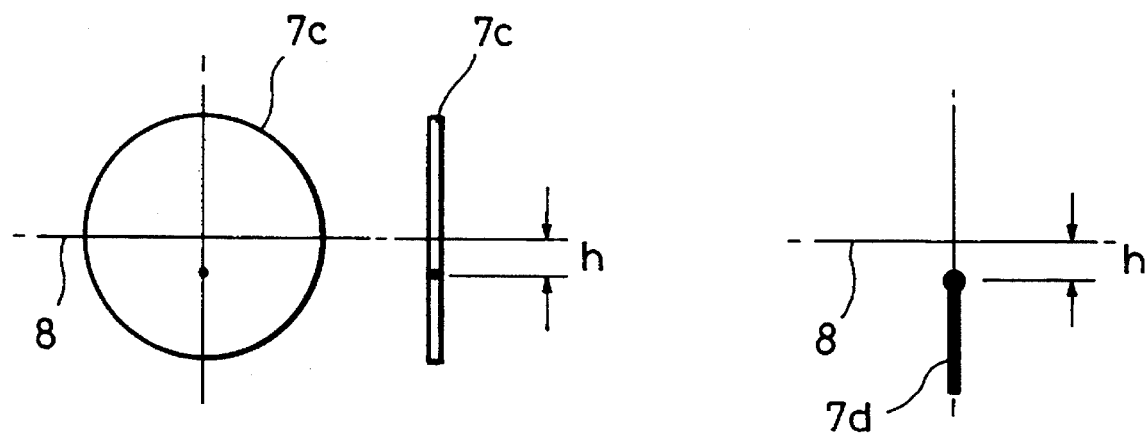

ENCODER WITH AN OPTICAL SCALE AND INTERFERENCE OF ZERO AND FIRST ORDER DIFFRACTION BEAMS

BACKGROUND OF THE INVENTION

1. Field of the Invention

This invention relates to an encoder and, in particular, to an encoder, such as a rotary encoder or a linear encoder, in which a luminous flux is caused to impinge upon a moving body having an optical scale formed by periodically arranging a plurality of diffraction gratings on the outer or the inner peripheral surface of a cylindrical body or on a planar surface, the luminous flux transmitted through this optical scale being utilized to detect movement information regarding the moving body.

2. Description of the Related Art

A rotary or linear photoelectric encoder has conventionally been used as a means for detecting the rotational speed, or variations in the rotational speed, of a rotating mechanism, or variations in the amount of movement of a linearly moving body. For example, such an encoder has been used in the floppy-disk driving mechanism of computer equipment, in an office machine, such as a printer, in a numerically controlled machine tool, in the capstan motor of a VTR, or in any other type of rotating mechanism such as a rotary drum.

FIG. 1 schematically shows the essential parts of a conventional rotary encoder utilizing Talbot interference.

Referring to FIG. 1, numeral 1 indicates a semiconductor laser which emits a coherent luminous flux having a wavelength $\lambda$. Numeral 2 indicates a collimator lens system for converting a divergent luminous flux from the semiconductor laser 1 to an approximately parallel luminous flux. The semiconductor laser 1 and the collimator lens system 2 together form a light irradiation means LR. Numeral 3 indicates an optical scale having a translucent grating section consisting of a plurality of V-grooves formed on the inner peripheral surface of a cylindrical body at fixed intervals. The optical scale 3 rotates in the direction indicated by the arrow in FIG. 1.

The optical scale 3 is formed of a translucent optical material. Arranged to the side of the optical scale 3 opposite to the light irradiation means LR are three photodetectors 4a, 4b and 4c which form a light receiving means 4. The respective output terminals of these photodetectors are connected to a signal processing circuit 5, which includes a pulse counting circuit, a rotating direction judging circuit, a signal interpolation processing circuit, etc.

In the rotary encoder of FIG. 1, the luminous flux from the light irradiation means LR is caused to impinge upon an area 3a (a first scale) of the optical scale 3 to undergo optical modulation (diffraction), and is further caused to impinge upon another area 3b (a second scale) of the optical scale 3, where it undergoes further optical modulation (deflection) to be output from the optical scale 3 in a plurality of luminous fluxes, which are received by the light receiving means 4. By utilizing output signals from the light receiving means 4, rotational information regarding the optical scale 3 is detected.

FIG. 4 illustrates how the luminous flux from the first scale 3a of FIG. 1 impinges upon the second scale 3b.

The distance d between the gratings of the first and second scales 3a and 3b of the scale 3 as measured along the optical axis (i.e., the inner diameter of the scale 3) is set so as to satisfy the following equation:

$$d = N_a \times P^2 / \lambda \ (N_a = 1, 2, 3, \ldots)$$

where P is the grating pitch and $\lambda$ is the wavelength of the luminous flux from the semiconductor laser 1.

Positioned at a distance of $N_a \times P^2/\lambda$ ($N_a = 1, 2, 3, \ldots$) from the first scale 3a is a Fourier image plane where a clear optical image is formed, which image has an intensity distribution of the same grating pitch as the grating of the first scale 3. At any other position in the direction of the optical axis, a reduction in intensity occurs at the same grating pitch as the grating of the first scale 3a, thus allowing the formation of an optical image having an intensity distribution of low contrast in which there is a conspicuous reduction in the high-frequency components.

Therefore, any change in the wavelength $\lambda$ of the luminous flux from the semiconductor laser resulting from a change in the environmental conditions, such as temperature, causes the Fourier-image-forming position of the grating of the first scale 3a to be offset relative to the grating surface of the second scale 3b. This causes a reduction in the S/N ratio of the detection signals detected by the light receiving means 4, resulting in a deterioration in the accuracy of detection of movement information regarding the optical scale 3.

SUMMARY OF THE INVENTION

It is an object of the present invention to provide an encoder in which diffracted rays of predetermined orders of the diffracted rays of light from the first scale are intercepted or attenuated, and two-flux interference mainly of zero order and $-1$st order diffracted rays, or of zero order and $+1$st order diffracted rays, is utilized to form, on the second scale, an optical image of high contrast having an intensity distribution of the same grating pitch as the first scale, thereby expanding the range in the optical-axis direction (the diametral direction) in which a clear optical image can be obtained, and making it possible to obtain detection signals of a high S/N ratio even when, for example, the wavelength of the luminous flux from the semiconductor laser has changed, whereby movement information on the moving object can be detected with high accuracy.

In accordance with the present invention, there is provided an encoder wherein luminous flux from a light irradiation means is applied to a first one of a plurality of optical scales consisting of gratings arranged on a moving body at fixed intervals, and the luminous flux diffracted by the first scale is caused to impinge upon a second one of the plurality of optical scales to undergo optical modulation before being received by a light receiving means. Arranged in the section of the optical path between the first and second scales is a light adjustment means for intercepting or attenuating a $+1$st or a $-1$st diffracted ray of the diffracted rays of light from the first scale when movement information regarding the moving body is detected by using signals from the light receiving means, an optical image having an intensity distribution of the same grating pitch as the first scale being formed on the second scale mainly by the zero order and $-1$st order diffracted rays or by the zero order and $+1$st order diffracted rays.

In particular, the above-mentioned light adjustment means features an optical member for intercepting or attenuating a ray of light passing a Fourier spectral position of a $+1$st order or $-1$st order in a Fourier transform plane of the first scale, and a prism member having a reflecting surface for totally reflecting that diffracted ray of the $\pm 1$ order diffracted rays of light which is incident at a predetermined incident angle.

BRIEF DESCRIPTION OF THE DRAWINGS

FIG. 5 partially illustrates the encoder of FIG. 2;

FIGS. 6(A) and 6(B) partially illustrate the encoder of FIG. 2;

DESCRIPTION OF THE PREFERRED EMBODIMENT

Figure 1:
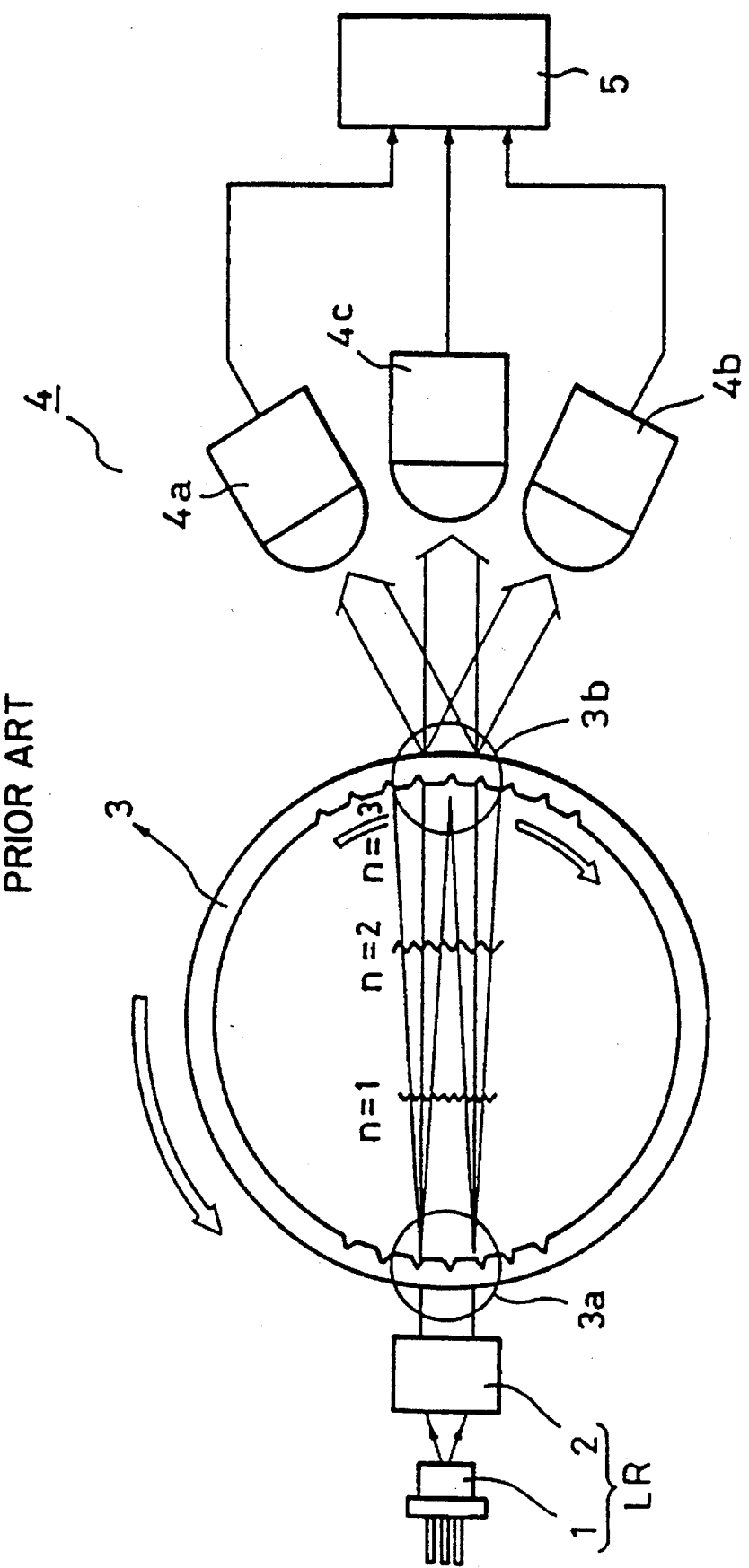
FIG. 1 schematically shows the essential parts of a conventional Talbot-type encoder.
Figure 2:
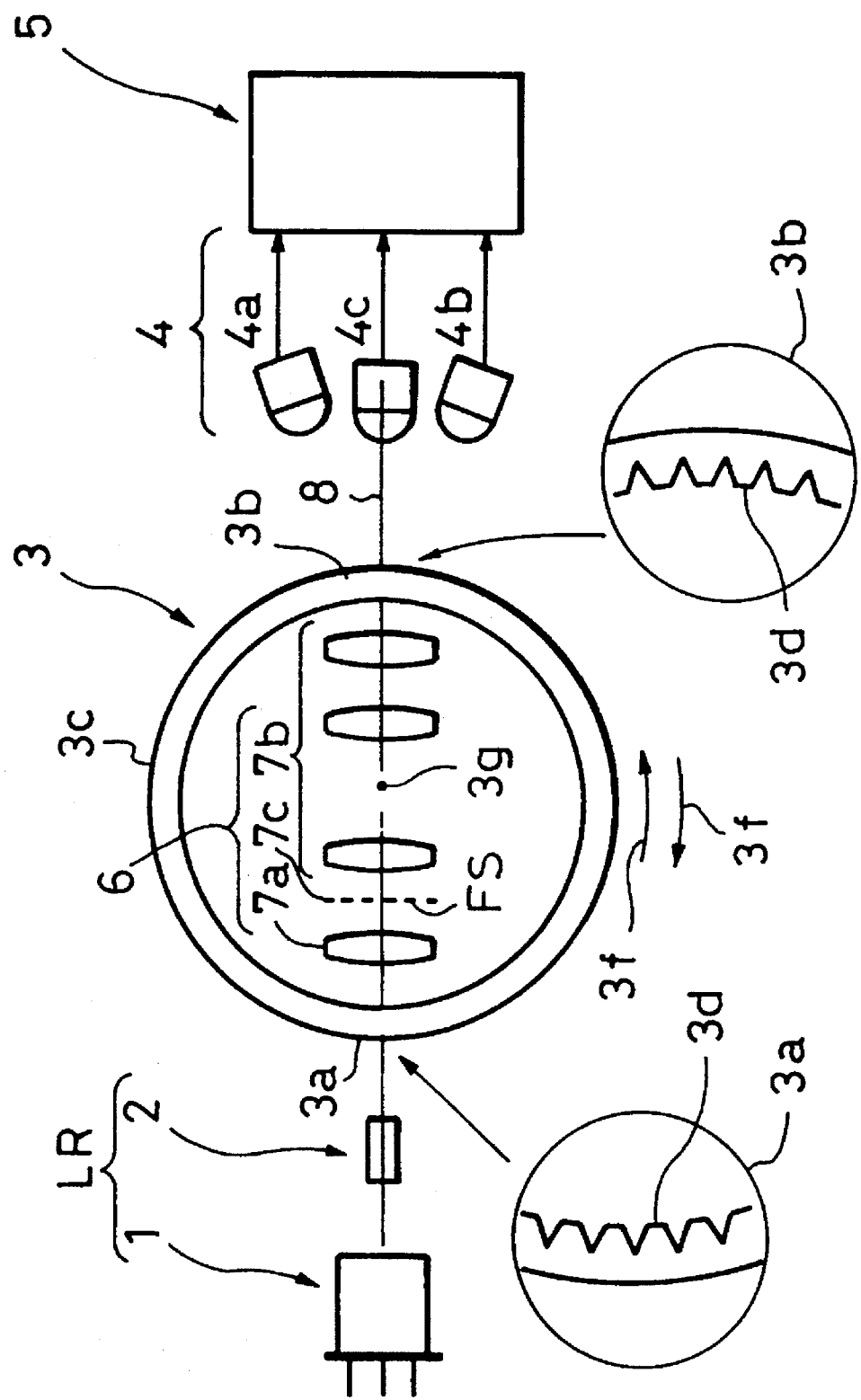
FIG. 2 schematically shows the essential parts of an encoder according to an embodiment of this invention.

FIG. 2 schematically shows the essential parts of an encoder according to an embodiment of the present invention. Referring to the drawing, symbol LR indicates a light irradiation means which includes a semiconductor laser 1 and a collimator lens 2. Numeral 3 indicates an optical scale formed by arranging a plurality of gratings (grating sections) 3d at fixed intervals on the inner or outer peripheral surface of a cylindrical member 3c. The optical scale 3, which is made of a translucent optical material, is formed as a part of a rotating body (not shown), and integrally rotates with the rotating body around a rotational axis 3g.

As shown in FIGS. 2 and 3, the gratings 3d consist of V-grooves (V-groove sections) and curved-surface sections. Each of the V-grooves extends along a dimension perpendicular to the direction of the arrow 3f in which the optical scale 3 rotates (i.e., a dimension along the rotational axis 3g) and has two surfaces inclined in opposite directions. The curved-surface sections, hereinafter referred to as the "planar sections", are substantially flat, though they have a slight curvature due to the cylindrical configuration of the member 3c.

Figure 3A:
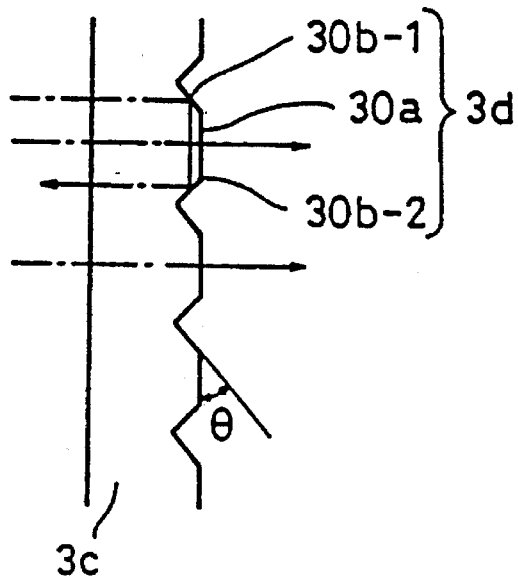
FIGS. 3(A) and 3(B) partially illustrate the encoder of FIG. 2.
Figure 3B:
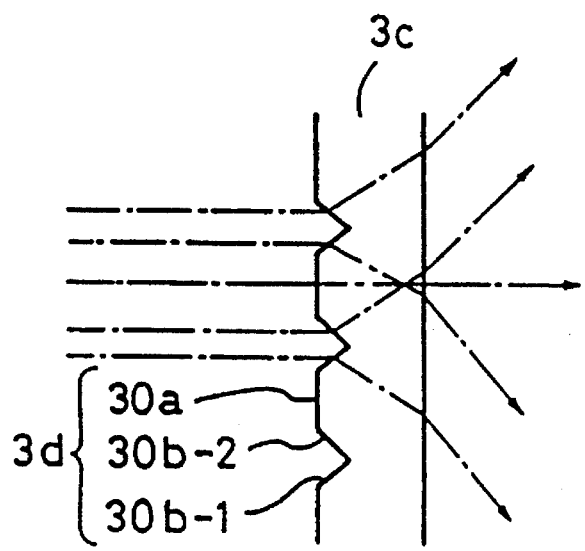

FIGS. 3(A) and 3(B) are detailed views of some of the gratings of the optical scale 3. As shown in the drawings, V-groove sections 30b-1 and 30b-2 and planar sections 30a are alternately arranged to form the gratings 3d. There are n V-grooves in total arranged circumferentially on the inner peripheral surface of the cylindrical member 3c, at equal intervals at a pitch P. The V-grooves have a width of ½·P each, and the two planar sections on either side of each V-groove has a width of ¼·P each. The inclination angle θ of each V-groove, which is larger than the critical angle with respect to a straight line connecting the bottom and the center of the groove, is 45° in this embodiment.

The distance d between a first scale (a first area) 3a and a second scale (a second area) 3b of the optical scale 3 as measured along the optical axis 8 (i.e., along the inner diameter of the optical scale 3) is set so as to satisfy the following equations:

$$d = N \cdot P^2 / \lambda \quad (N: \text{natural number})$$

$$P = \pi d / n \quad (n: \text{the total number of slits (V-grooves)})$$

where P is the grating pitch and $\lambda$ is the wavelength.

Numeral 6 indicates a light adjustment means provided inside the cylindrical member 3c and equipped with double-diffraction optical systems (7a, 7b) and an optical member 7c. As described below, the light adjustment means 6 intercepts or attenuates a +1st order or a −1st order diffracted ray of the diffracted rays of light from the first scale 3a so as to form on the second scale 3b an optical image having an intensity distribution of the same grating pitch as the first scale by two-flux interference between the zero order and the −1st order diffracted rays or between the zero order and the +1st order diffracted rays.

Numeral 4 indicates a light receiving means, which includes three photodetectors (light receiving devices) 4a, 4b and 4c for respectively receiving three luminous fluxes output from the optical scale 3 after being light-modulated thereby. Numeral 5 indicates a signal processing circuit for detecting rotational information on the optical scale 3 by using signals from the light receiving means 4, as described below.

Next, the construction of the light adjustment means 6 of this embodiment will be described.

Figure 4:
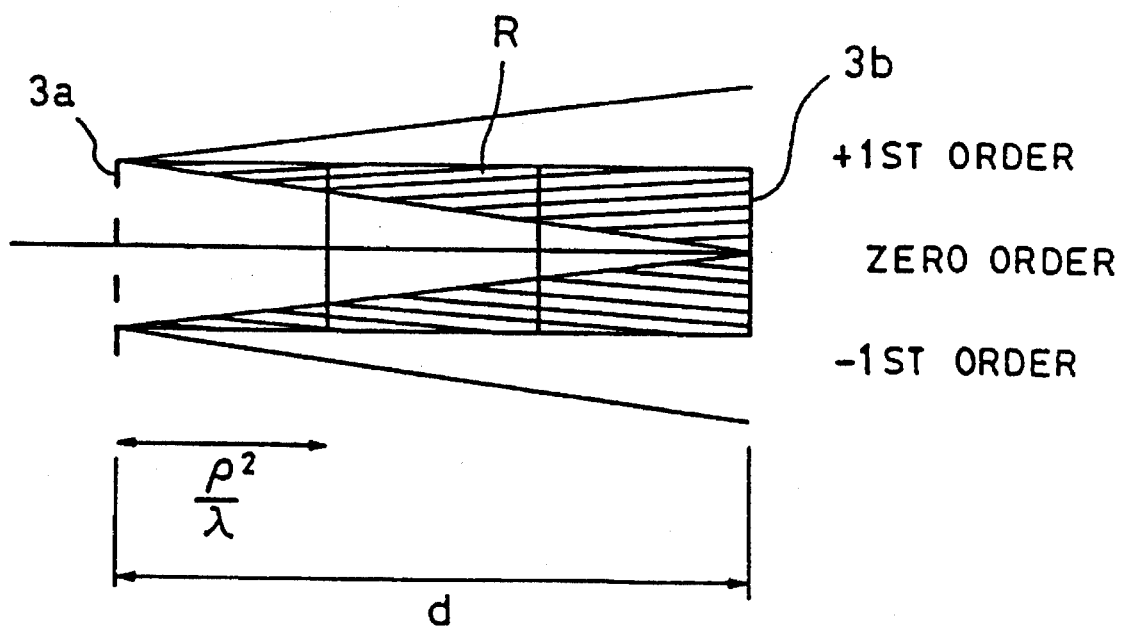
FIG. 4 is an optical-path diagram illustrating diffracted rays of light output from a grating.

As stated above, FIG. 4 is a diagram illustrating the relationship in which the diffracted rays of light from the first scale 3a stand with the second scale 3b. The shaded range R in FIG. 4 contains a brightness distribution (an optical image) of the same grating pitch as the first scale 3a formed mainly by two-flux interference between the zero order and the −1st order diffracted rays, and between the zero order and the +1st order diffracted rays, generated through diffraction by the grating of the first scale 3a. This brightness distribution is not affected by any change in the wavelength $\lambda$ of the luminous flux from the semiconductor laser 1 for the reason given below:

The grating pitch P of the first scale 3a is constant. Assuming that the wavelengths of the luminous flux before and after a change are $\lambda a$ and $\lambda b$, respectively, and the diffraction angles of the 1st order or −1st order diffracted ray before and after the change are θa and θb, respectively, the following equations are obtained:

$$P = \lambda a / \sin \theta a \quad (1)$$

$$P = \lambda b / \sin \theta b \quad (2)$$

Suppose the brightness-distribution pitches of this two-flux interference before and after the change in wavelength are Ta and Tb, respectively. Because of the respective diffraction angles of θa and θb of these luminous fluxes, the pitches Ta and Tb can be expressed as follows:

$$Ta = \lambda a / \sin \theta a$$

$$Tb = \lambda b / \sin \theta b$$

From equations (1) and (2), Ta=Tb. Thus, this brightness distribution remains constant before and after any change in wavelength.

In the present invention, the light adjustment means 6 is utilized to intercept or attenuate one of the ±1st order diffracted rays, and a brightness distribution of the same grating pitch as the grating of the first scale 3a is formed with respect to the grating of the second scale 3b over a wide range along the optical axis 8 (along the dimension of the inner diameter of the optical scale 3) while keeping the contrast at a satisfactory level. Due to this arrangement, there is substantially no deterioration in the S/N ratio of the signals detected by the detecting means 4 even when, for example, a change has occurred in the wavelength of the luminous flux from the semiconductor laser as a result of environmental changes.

FIG. 5 schematically shows the essential parts of the light adjustment means 6 of FIG. 2. In this embodiment, the light adjustment means is composed of double diffraction optical systems 7a and 7b, and an optical member 7c consisting of a filter. One of the ±1st order diffracted rays is intercepted or attenuated by the optical member 7c.

Referring to FIG. 5, a coherent ray of light is caused to impinge upon the grating of the first scale 3a and undergo Fourier transform by the Fourier transform lens 7a, thereby obtaining a Fourier spectrum plane FS. After that, the ray of light undergoes further Fourier transform by the Fourier transform lens 7b, thereby forming an optical image on the grating surface of the second scale 3b.

The optical member 7c intercepts or attenuates the luminous flux passing through a position at a height h which is expressed as:

$$h = f \cdot \sin \theta$$

where f is the focal length of the Fourier transform lens 7a; θ is the diffraction angle of the +1st order or the −1st order diffracted ray; and h is a height in the Fourier spectrum plane as measured from the optical axis 8.

FIG. 6(A) illustrates the optical member 7c, whose section corresponding to the height h is made opaque or consists of a filter having a low transmittance.

In this embodiment, it is also possible to adopt an optical member 7d whose section corresponding to the height h or more as measured from the optical axis 8 is made opaque, as shown in FIG. 6(B). Further, it is also possible for the optical member to be opaque not only to a 1st order diffracted ray but also to diffracted rays of higher orders.

Next, the method of detecting rotational information regarding the optical scale 3 (the rotating body) as the encoder of this embodiment will be described.

The luminous flux from the semiconductor laser 1 is converted into a convergent luminous flux by adjusting the position of the collimator lens system 2, which convergent luminous flux is caused to impinge upon the first scale (the first area) of the optical scale 3. The conversion to a convergent luminous flux is required because of the difference in curvature between the outer and inner peripheral surfaces of the optical scale 3, which difference imparts to the optical scale a refracting power corresponding to that of a concave lens that could change a ray of light entering the optical scale 3 to a substantially parallel ray.

FIG. 3(A) shows how this convergent luminous flux is caused to impinge upon the grating 3d of the first area 3a. The portion of the luminous flux which reaches the grating section 30a is transmitted therethrough to enter the cylinder. The portion of the luminous flux which reaches the grating surface 30b-1 undergoes total reflection due to the inclination angle of the surface which is set larger than the critical angle, and is directed to the surface 30b-2, where it further undergoes total reflection, with the result that the ray of light having reached the surface 30b-1 is returned by substantially the same route by which it came, without entering the cylinder. Similarly, the portion of the luminous flux reaching the surface 30b-2 is returned as a result of repeated total reflection.

Thus, the luminous fluxes reaching the ranges of the two inclined surfaces 30b-1 and 30b-2 forming the V-groove in the first area 3a are reflected and do not enter the cylindrical member, so that only the ray of light reaching the grating section 30a is allowed to enter the cylindrical member. That is, in the first area 3a, the V-groove-type grating 3d functions in the same way as an amplitude diffraction grating of the transmission type.

A luminous flux is diffracted by the grating 3d of the first area 3a, whereby diffracted rays of zero order, ±1st order, ±2nd order, . . . are generated. As a result of interference between two or three of the zero order and the ±1st order diffracted rays, a Fourier image on the grating of the first area 3a is formed in the interior of the optical scale 3 through the light adjustment means 6. As stated above, in this embodiment, the light adjustment means 6 intercepts or attenuates one of the ±1st order diffracted rays.

Referring to FIG. 3(B), the portion of the luminous flux which impinges upon the surface 30a of the second area 3b is substantially perpendicular to the surface, so that it is transmitted straight therethrough to reach the photodetector (light receiving device) 4c. Those portions of the luminous flux reaching the two inclined surfaces 30b-1 and 30b-2 forming the V-groove are at an incident angle of approximately 45° with respect to these inclined surfaces, so that they are greatly refracted in different directions before they reach the photodetectors 4a and 4b, respectively.

Thus, in the second area 3b, the luminous flux is divided in three portions by three differently inclined surfaces consisting of two inclined surfaces in each V-grooves and a flat surface therebetween, and reach the photodetectors 4a, 4b and 4c, which are arranged at positions corresponding to the inclinations of these three surfaces. That is, in the second area 3b, the V-groove grating functions as a light-wave-front splitting device.

Here, rotation of the optical scale 3 causes the respective quantities of light detected by the photodetectors 4a, 4b and 4c to vary. The light quantity balance incident upon the photodetectors varies in accordance with the relative displacement between the position of the grating of the second area and the position of the Fourier image. For example, when the optical scale 3 rotates counterclockwise, a variation in quantity of light as shown in FIG. 7 accompanies it.

Figure 7:
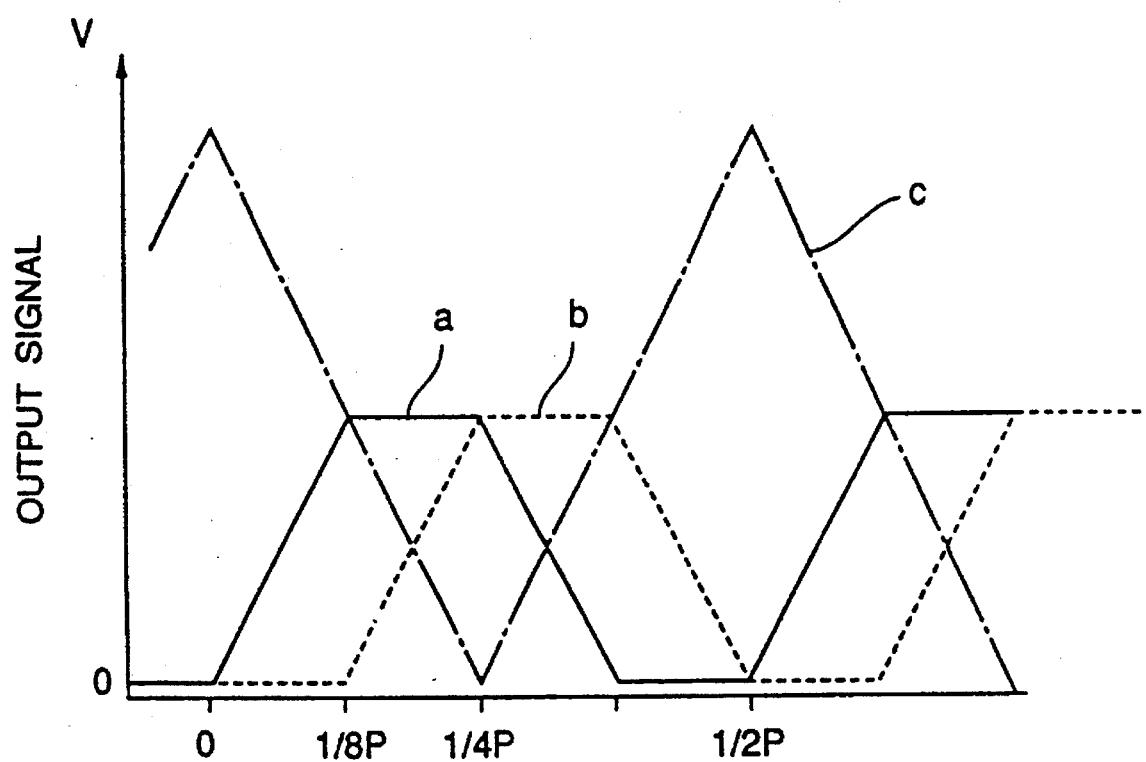
FIG. 7 illustrates output signals from a detection means in FIG. 2.

In FIG. 7, the horizontal axis indicates the rotational amount of the optical scale 3, and the vertical axis indicates the quantity of light received. The symbols a, b and c correspond to the photodetectors 4a, 4b and 4c, respectively. When, conversely, the optical scale 3 rotates clockwise, the symbols a, b and c represent the outputs of the photodetectors 4b, 4a and 4c, respectively. It is this difference that makes it possible to discriminate the rotating direction.

It should be noted that FIG. 7 shows a substantially ideal, theoretical variation in quantity of light, in which the Fourier image exhibits a very high contrast. When the contrast of the Fourier image is low, the signals a, b and c approach a sinusoidal waveform. In this embodiment, the rotational information regarding the optical scale 3 is detected on the basis of the signals a, b and c in such a condition.

Figure 8A:
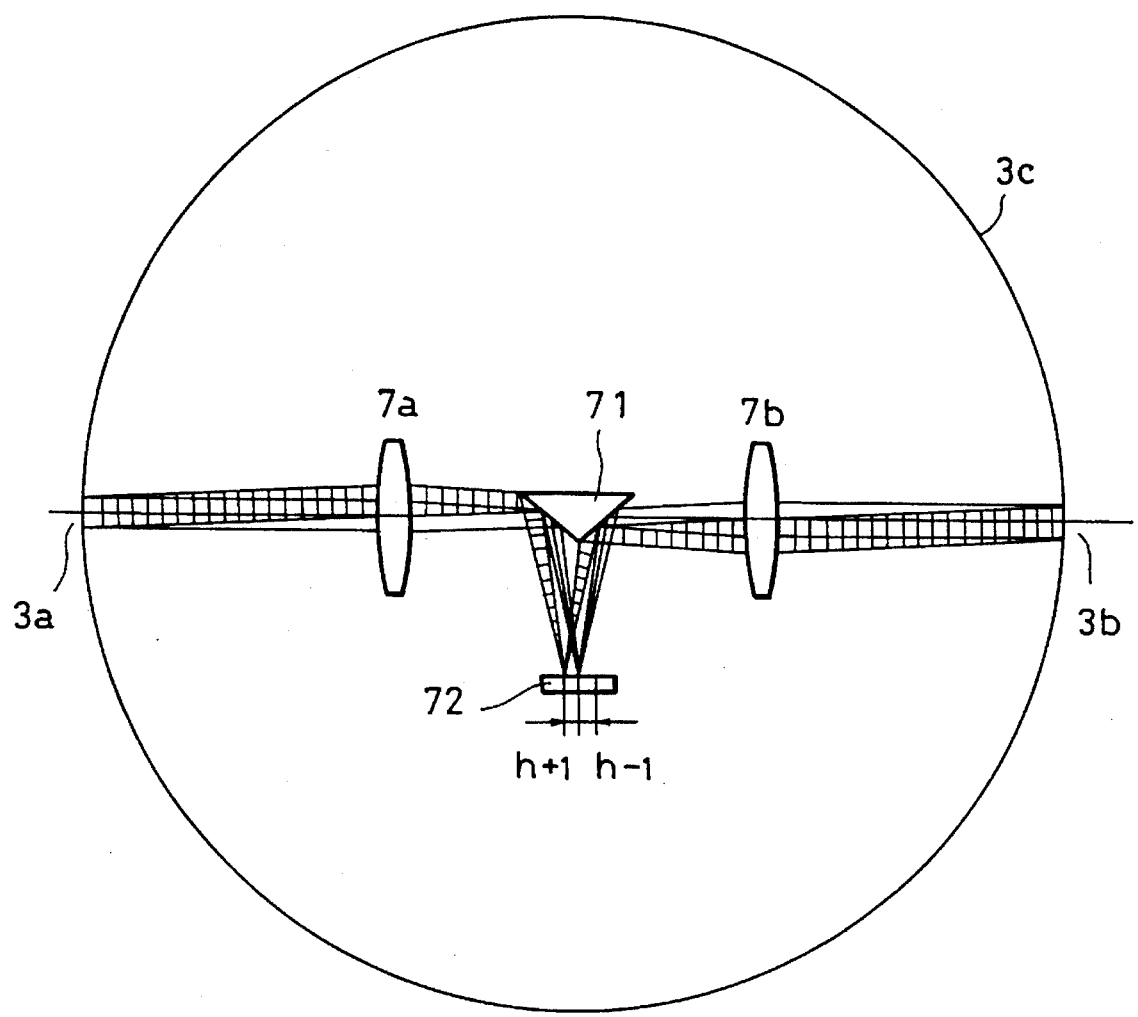
FIGS. 8(A) and 8(B) schematically show the essential parts of an encoder according to another embodiment of the present invention.
Figure 9A:
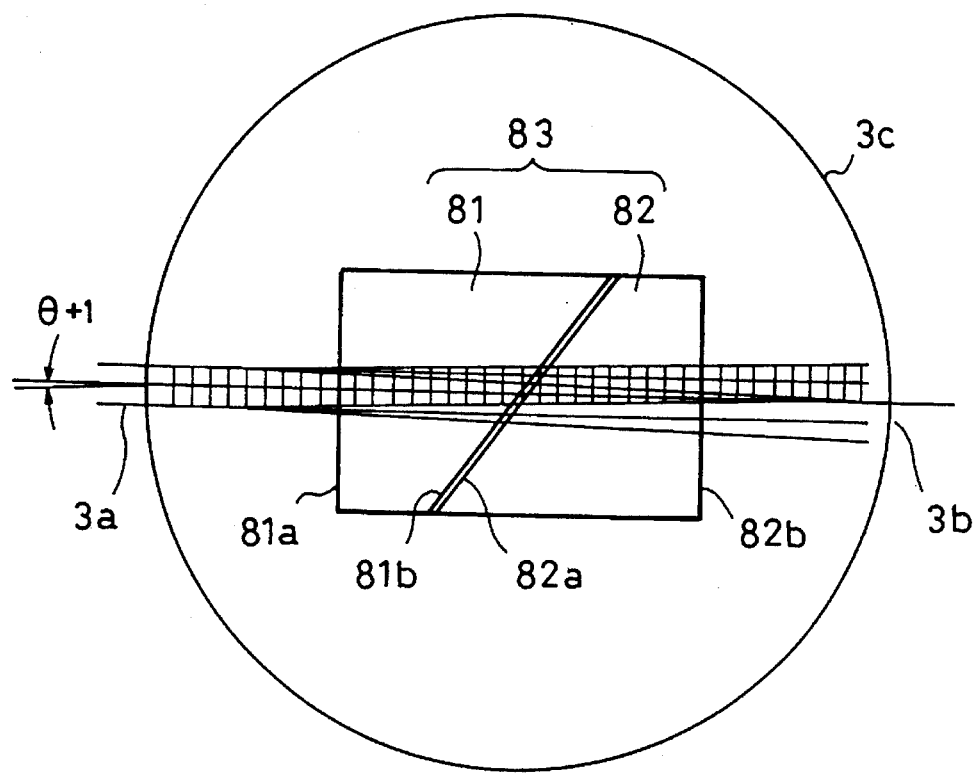
FIGS. 9(A) and 9(B) schematically show the essential parts of an encoder according to still another embodiment of the present invention.

FIGS. 8(A) and 9(A) schematically show the essential parts of the optical scales 3 of the encoders of the second and third embodiments of the present invention.

Figure 8B:
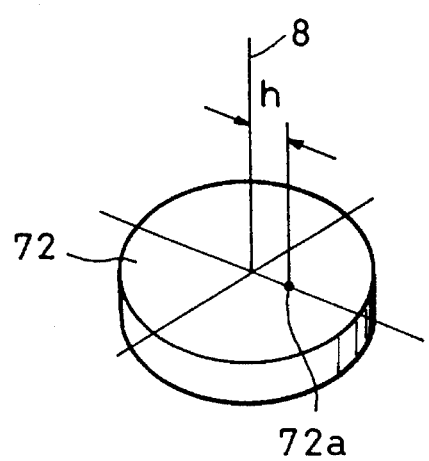

In the second embodiment, shown in FIGS. 8(A) and 8(B), the diffracted ray of light from the first scale 3a is transmitted through the Fourier transform lens 7a and a mirror 71 and caused to impinge upon a mirror 72 arranged at a position corresponding to the Fourier spectrum plane FS. The mirror 72 corresponds to the filter 7c of FIG. 2. A section 72a of the mirror 72 which corresponds to the height h as measured from the optical axis 8 is formed as a non-reflection surface or a surface with low reflectance by chromium etching, masking or the like.

Due to the above arrangement, one of the +1st order and −1st order diffracted rays is intercepted or attenuated. Then, the luminous flux reflected in the direction of the mirror 71 by the mirror 72 is transmitted through the Fourier transform lens 7b to the second scale 3b. With this arrangement, this embodiment provides the same effect as the first one.

Figure 9B:
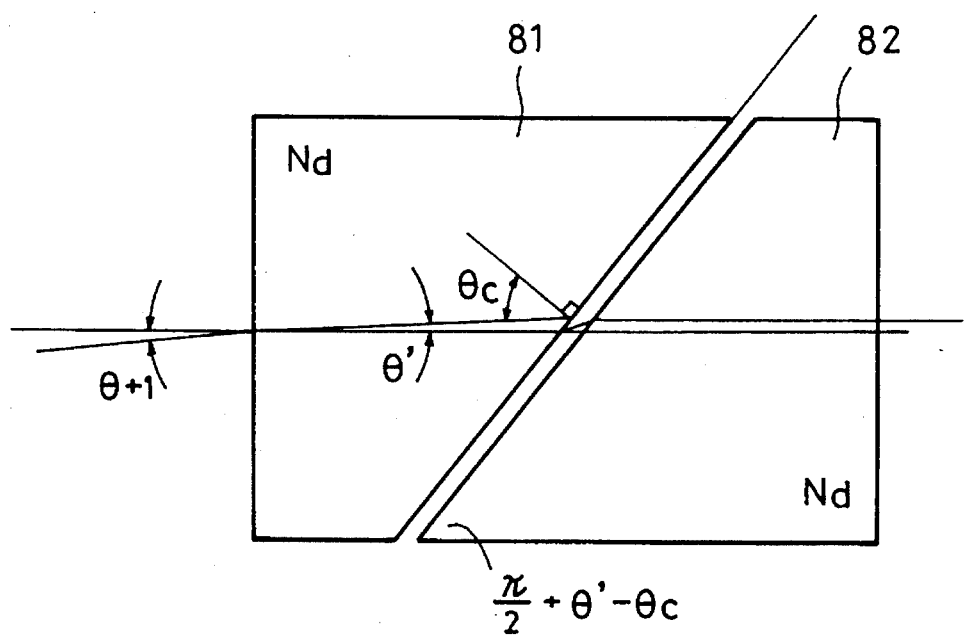

In the third embodiment, shown in FIGS. 9(A) and 9(B), the light adjustment means consists of a prism member 83, which is arranged inside the cylindrical member 3c. The prism member 83 is composed of two prisms 81 and 82 (of a material having a refractive index Nd) whose inclined surfaces 81b and 82a face each other through the intermediation of a slight air gap.

As shown in FIG. 9(B), the prism apex angle, the refractive index Nd, etc. are set in such a way that one of the ±1st order diffracted rays of light from the first scale 3a is totally reflected by the inclined surface 81b of the prism.

Then, the diffracted ray of light is transmitted through the inclined surfaces 81b and 82a and the output surface 82b to the second scale 3b, whereby the same effect as in the first embodiment is obtained.

In the present invention, it is also possible to generate, for example, a plane wave which advances in a direction reverse to the +1st order diffracted ray and which is in phase therewith, thereby intercepting or attenuating the +1st order diffracted ray. Further, the present invention is applicable not only to a rotary encoder but also to a linear encoder or any displacement measuring device of the type which utilizes a diffracted ray of light from a diffraction grating.

As described above, in accordance with the present invention, there is provided an encoder in which diffracted rays of predetermined orders of the diffracted rays of light from the first scale are intercepted or attenuated, and two-flux interference mainly of zero order and −1st order diffracted rays, or of zero order and +1st order diffracted rays, is utilized to form, on the second scale, an optical image of high contrast having an intensity distribution of the same grating pitch as the first scale, thereby expanding the range in the optical-axis direction (the diametral direction) in which a clear optical image can be obtained, and making it possible to obtain detection signals of a high S/N ratio even when, for example, the wavelength of the luminous flux from the semiconductor laser has changed, whereby movement information on the moving object can be detected with high accuracy.

What is claimed is:

1. An encoder comprising;

a first optical scale consisting of a grating of a fixed pitch;

light irradiation means for irradiating said first optical scale with light;

a second optical scale consisting of a grating of a fixed pitch, light transmitted through said first optical scale being caused to impinge upon said second optical scale;

light receiving means for receiving light transmitted through said second optical scale; and light adjustment means for intercepting or attenuating either a +1st order or −1st order diffracted ray of rays of light obtained by diffraction at said first optical scale out of the light transmitted therethrough; wherein said light adjustment means includes a prism member having a reflection surface for totally reflecting a ray of light incident upon it at a predetermined incident angle, said +1st order or −1st order diffracted ray of light being reflected by said reflection surface.

2. An encoder comprising:

a rotary optical scale having optical scale sections consisting of gratings of a fixed pitch provided in a periphery of a cylindrical member;

light irradiation means for irradiating a first grating of said rotary optical scale with light;

light adjustment means for intercepting or attenuating either a +1st order or −1st order diffracted ray of diffracted rays of light from said first grating; and light receiving means for receiving light transmitted through a second grating of said optical scale, wherein said light adjustment means includes a prism member having a reflection surface which totally reflects a ray of light incident upon it at a predetermined incident angle, said +1st order or −1st order diffracted ray being reflected by said reflection surface.

3. An encoder comprising:

a first optical scale consisting of a grating of a fixed pitch;

a second optical scale consisting of a grating of a fixed pitch;

light irradiation means for irradiating said first optical scale;

a double-diffraction optical system provided between said first and second gratings for forming an image of said first optical scale on said second optical scale;

an optical member provided on a Fourier spectrum plane of said double-diffraction optical system for intercepting or attenuating either a +1st order or a −1st order diffraction light diffracted by said first optical scale; and light receiving means for receiving light transmitted through said second optical scale.

4. An encoder according to claim 1, wherein said double-diffraction optical system forms a correct image of said first optical scale on said second optical scale.

5. An encoder comprising:

a rotary optical scale consisting of a grating of a fixed pitch provided in a periphery of a cylindrical member;

light irradiation means for irradiating a first portion of said rotary optical scale;

a double-diffraction optical system for forming an image of said first portion of said rotary optical scale on a second portion of said rotary optical scale;

an optical member provided on a Fourier spectrum plane of said double-diffraction optical system for intercepting or attenuating either a +1st order or a −1st order diffraction light diffracted by said first portion;

light receiving means for receiving light transmitted through said second portion of said rotary optical scale.

6. An encoder according to claim 1, wherein said double-diffraction optical system forms a correct image of said first portion of said optical scale on said second portion of said optical scale.

* * * * *

UNITED STATES PATENT AND TRADEMARK OFFICE
CERTIFICATE OF CORRECTION

PATENT NO. : 5,481,106
DATED : January 2, 1996
INVENTOR(S) : Nyui et al.

It is certified that error appears in the above-indentified patent and that said Letters Patent is hereby corrected as shown below:

COLUMN 2:

Line 25, "0F" should read --OF--.

COLUMN 6:

Line 30, "V-grooves" should read --V-groove--.

COLUMN 8:

Line 41, "claim 1," should read --claim 3,--;
  Line 55, "portion;" should read --portion; and--; and
  Line 58, "claim 1," should read --claim 5,--.

Signed and Sealed this

Twenty-eighth Day of May, 1996

Attest:

BRUCE LEHMAN

Attesting Officer    Commissioner of Patents and Trademarks